W. L. DALY.
REFRIGERATING PAIL,
APPLICATION FILED MAR. 5, 1912.

1,103,016.

Patented July 7, 1914.

Inventor
William L. Daly

Witnesses
M. F. Gannett
James Koene

By Victor J. Evans
Attorney

THE NORRIS PETERS CO., PHOTO-LITHO., WASHINGTON, D. C.

UNITED STATES PATENT OFFICE.

WILLIAM L. DALY, OF SCHENECTADY, NEW YORK.

REFRIGERATING-PAIL.

1,103,016.   Specification of Letters Patent.   Patented July 7, 1914.

Application filed March 5, 1912. Serial No. 681,815.

*To all whom it may concern:*

Be it known that I, WILLIAM L. DALY, a citizen of the United States, residing at Schenectady, in the county of Schenectady and State of New York, have invented new and useful Improvements in Refrigerating-Pails, of which the following is a specification.

This invention relates to ice-cream pails and has for an object to provide a device of this character which will be simple in construction, strong and durable, and which will be adapted to preserve the ice-cream and keep the same in a frozen state for a considerable length of time.

Another object of the invention is to provide an ice cream pail which will include outer and inner receptacles which are spaced from each other so that a refrigerant such as ice can be effectively made to entirely surround the inner receptacle, and confined in such manner as will prevent the ice from entering the inner receptacle.

Another object of the invention is to provide a pail wherein the inner and outer vessels are so connected with each other that one materially acts to reinforce the other.

Figure 1:
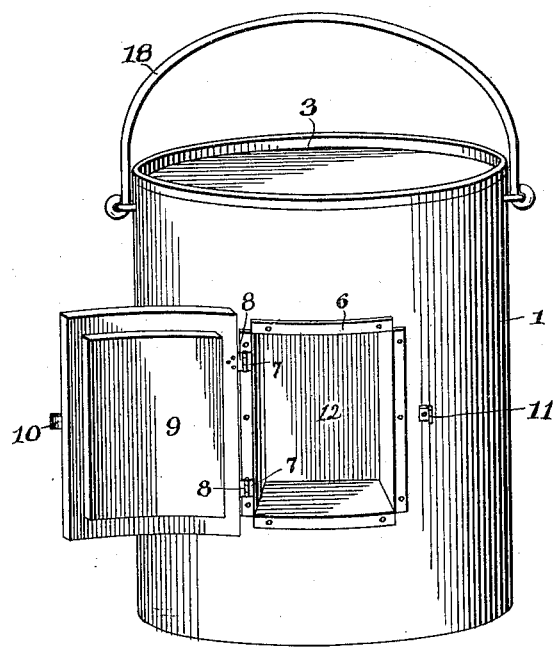
Figure 2:
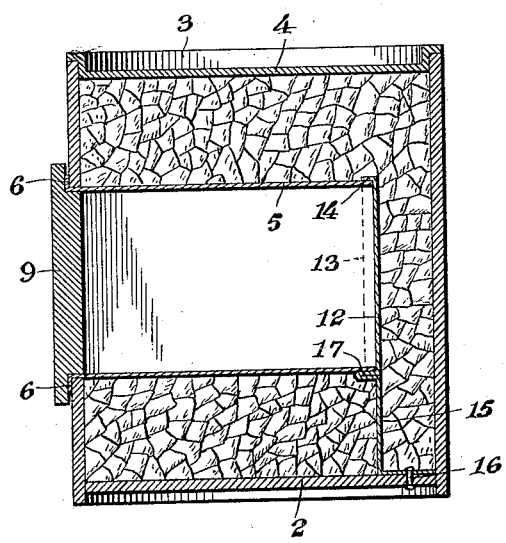

In the drawing forming a portion of this application and in which like letters of reference indicate similar parts in the several views:—Figure 1 is a perspective view of the pail showing a door of the vessel open. Fig. 2 is a vertical section through the pail.

The pail comprises an outer vessel 1 which may be constructed of any suitable well-known material which may be found most desirable for the purpose intended, and as illustrated the said pail is provided with a fixed bottom 2 and a removable top cover 3. The cover is stamped from a single piece of metal and it is struck up to present a depending portion 4 whose peripheral walls are adapted to contact with the walls of the vessel 1 as clearly shown in Fig. 2.

The inner vessel 5 is horizontally disposed within the vessel 1. This vessel is of rectangular configuration and at one end it is open and its walls are extended through an opening in the outer vessel, the walls of said inner vessel having formed thereon suitable attaching flanges 6 which are riveted or otherwise suitably secured to the walls of the said outer vessel. One of the vertical flanges 6 of the inner vessel is provided with hinge knuckles 7 which are associated with similar hinge knuckles 8 upon one of the vertical walls of the swinging door 9. This door carries a suitable clasp 10 which is designed to engage with the keeper 11 upon the vessel 1 whereby the door may be held closed. A cap 12 having side flanges 13 and a top flange 14 is secured to the vertical walls and the top wall of said vessel 5. The said cap is provided with an integral brace 15 which extends downward in the direction of the bottom 2, being secured to the latter as at 16. The said brace 15 is folded on itself as at 17 to present a flange similar to the hereinbefore described flanges 13 and 14. This flange 17 serves to materially reinforce the device and to sustain the weight of the vessel 5. Excepting for the front of the vessel 5 the walls thereof are spaced from the walls of the vessel 1 so that a refrigerant such as ice may be packed around the inner vessel. In this manner the walls of the vessel 5 are so subjected to the refrigerating action of the ice that the contents of the said vessel 5 may be stored for a considerable length of time.

The pail described, while being particularly desirable for use in the shipment of small quantities of ice cream may be made of any size as may depend upon the use to which it is to be put. For the purpose of convenience the pail herein shown is provided with a bail 18 whereby the device can be conveniently carried from place to place. It is to be appreciated, that, with the construction described one is permitted to quickly and conveniently remove the contents of the inner vessel 5 without disturbing the surrounding ice.

I claim:—

A refrigerating pail comprising an outer vessel having a fixed bottom and a removable cover, the said receptacle having an opening at one side, an inner vessel extending into the outer vessel and through the opening and provided at its inner end with a cap, a brace secured to the bottom of the outer vessel and forming an integral part of said cap, and a swinging closure mounted exteriorly of the outer vessel and closable over the open end of the inner vessel and having a portion fitting thereinto when the closure is in a closed position.

In testimony whereof I affix my signature in presence of two witnesses.

WILLIAM L. DALY.

Witnesses:
  JACOB A. CRAMER,
  J. C. NILES.